United States Patent
Shahulhameed

(10) Patent No.: US 11,354,625 B2
(45) Date of Patent: Jun. 7, 2022

(54) EMPLOYMENT VERIFICATION SYSTEM

(71) Applicant: ADP, Inc., Roseland, NJ (US)

(72) Inventor: Ayeshaseerin Shahulhameed, Edison, NJ (US)

(73) Assignee: ADP, Inc., Roseland, NJ (US)

( * ) Notice: Subject to any disclaimer, the term of this patent is extended or adjusted under 35 U.S.C. 154(b) by 778 days.

(21) Appl. No.: 14/807,167

(22) Filed: Jul. 23, 2015

(65) Prior Publication Data

US 2017/0024700 A1    Jan. 26, 2017

(51) Int. Cl.
*G06Q 10/10* (2012.01)
*G06F 3/0481* (2022.01)

(52) U.S. Cl.
CPC ....... *G06Q 10/1053* (2013.01); *G06F 3/0481* (2013.01)

(58) Field of Classification Search
USPC .......................................................... 705/321
See application file for complete search history.

(56) References Cited

U.S. PATENT DOCUMENTS

| | | | |
|---|---|---|---|
| 5,920,861 A | 7/1999 | Hall et al. | |
| 6,115,690 A | 9/2000 | Wong | |
| 6,353,839 B1* | 3/2002 | King | G06F 17/218 715/236 |
| 6,394,356 B1* | 5/2002 | Zagami | G07C 9/00079 235/382 |
| 6,850,252 B1 | 2/2005 | Hoffberg | |
| 7,778,938 B2* | 8/2010 | Stimac | G06Q 10/1053 705/321 |
| 8,170,615 B2 | 5/2012 | Vanska et al. | |
| 8,533,110 B2* | 9/2013 | Kremen | G06Q 40/025 705/320 |
| 8,595,148 B1* | 11/2013 | Borgen | G06Q 10/105 705/26.5 |
| 8,904,181 B1 | 12/2014 | Felsher et al. | |
| 9,092,390 B1* | 7/2015 | Klau | G06F 16/23 |
| 2010/0153290 A1* | 6/2010 | Duggan | G06Q 10/1053 705/321 |

(Continued)

FOREIGN PATENT DOCUMENTS

| | | | |
|---|---|---|---|
| WO | WO0152167 A1 | 7/2001 | |
| WO | WO2012079170 A1 | 6/2012 | |
| WO | WO-2016044543 A1 * | 3/2016 | ......... G06F 21/6245 |

OTHER PUBLICATIONS

Gordon, Whitson "How Your Passwords Are Stored on the Internet (and When Your Password Strength Doesn't Matter)", Life hacker, Jun. 20, 2012, https://lifehacker.com/how-your-passwords-are-stored-on-the-internet-and-when-5919918 (Year: 2012).*

*Primary Examiner* — Sangeeta Bahl
*Assistant Examiner* — Rebecca R Novak
(74) *Attorney, Agent, or Firm* — Yee & Associates, P.C.

(57) ABSTRACT

A method for displaying proof of employment data verifies the employment data. A computer system displays a control in a graphical user interface for a display system. The control is configured to receive user input specifying an identifier for proof of employment data. The computer system receives the user input specifying the identifier through the control. The computer system retrieves the proof of the employment data based on the identifier. The computer system displays the proof of the employment data in the graphical user interface.

25 Claims, 9 Drawing Sheets

(56) References Cited

U.S. PATENT DOCUMENTS

| | | | |
|---|---|---|---|
| 2013/0048720 A1* | 2/2013 | Lewis | G06Q 10/00 |
| | | | 235/382 |
| 2013/0066796 A1* | 3/2013 | Shin | G06Q 10/063118 |
| | | | 705/321 |
| 2013/0097093 A1* | 4/2013 | Kolber | G06Q 10/1053 |
| | | | 705/321 |
| 2014/0137195 A1* | 5/2014 | Ballard | H04L 63/0823 |
| | | | 726/3 |
| 2014/0282900 A1 | 9/2014 | Wang et al. | |
| 2014/0353369 A1* | 12/2014 | Malin | G06K 19/06037 |
| | | | 235/375 |

* cited by examiner

EMPLOYMENT VERIFICATION SYSTEM

BACKGROUND INFORMATION

1. Field

The present disclosure relates generally to an improved data processing system. In particular, the present disclosure relates to a method and apparatus for identifying and displaying employment verification information. Still more particularly, the present disclosure relates to a method and apparatus for a graphical user interface used in identifying and displaying employment verification information dynamically generated from trusted data sources.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

The information systems may be used in performing operations for an organization. The operations may include hiring operations and project assignments.

For example, in filling a position in an organization, requirements for the position are identified as part of the process. The position may be filled from within the organization or by hiring someone from outside of the organization.

As another example, in assigning people to projects, various characteristics about the people may be used to identify who is most suited for different projects. The characteristics may include, for example, skills and experience that may be considered to identify people with the skills needed for a project.

A search in one or more databases in one or more information systems may be made to identify information about characteristics for people who may be suitable for a particular project. The search may return performance reviews, prior project assignments, emails, publications, tenure at the organization, and other information about people in the organization that may be used to identify who may be assigned to a project.

In filling a position, skills that are desired for the position may be identified from searching one or more information systems. Searching one or more information systems may identify information about characteristics that may be desirable for the position. For example, information about skills for people in the same or similar positions may be reviewed, as well as skills and experience of those people garnered from their previous experiences.

As part of identifying prospective candidates to fill a position, information systems including online profiles of the candidates may also be searched. However, because these profiles are created by the people themselves, organizations lack the resources to quickly determine the truthfulness of assertions made in these profiles by prospective candidates. An organization may use a third-party search firm to verify aspects of the profile, these searches represent an additional expense to the organization, and are therefore not to be performed as part of a first pass of the candidates. The results of a search for prospective candidates may be inaccurate, unverifiable, and more time-consuming than desired.

Therefore, it would be desirable to have a method and apparatus that take into account at least some of the issues discussed above, as well as other possible issues. For example, it would be desirable to have a method and apparatus that overcome a technical problem of verifying employment history asserted in an online profile that make identifying qualified people more cumbersome and time-consuming than desired.

SUMMARY

An embodiment of the present disclosure provides a method for displaying proof of employment data. A computer system displays a control in a graphical user interface for the display system that receive user input specifying an identifier for proof of employment data. The computer system receives the user input specifying the identifier to the control. Based on the identifier, the computer system retrieves the proof of employment data. The computer system then displays the proof of employment data in a graphical user interface.

Another embodiment of the present disclosure provides a computer system comprising a display system and a badge generator of an employment verification system in the computer system in communication with the display system. The badge generator displays a control in a graphical user interface for the display system that receives user input specifying an identifier for proof of employment data. The badge generator receives the user input specifying the identifier to the control. Based on the identifier, the badge generator retrieves the proof of employment data. The badge generator then displays the proof of employment data in the graphical user interface of the display system.

Yet another embodiment of the present disclosure provides computer program product for displaying proof of employment data comprising a computer readable storage media, and first program code, second program code, third program code, and fourth program code stored on the computer readable storage media. The first program code displays a control in a graphical user interface for the display system that receive user input specifying an identifier for proof of employment data. The second program code receives the user input specifying the identifier to the control. Based on the identifier, the third program code retrieves the proof of employment data. The fourth program code then displays the proof of employment data in a graphical user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred node of use, further objectives and features thereof, will best be understood by reference to the following detailed description of an illustrative embodiment of the present disclosure when read in conjunction with the accompanying drawings, wherein:

FIG. 3 is an illustration of an employment patch within a graphical user interface, depicted in accordance with an illustrative embodiment;

FIG. 5 is an illustration of a graphical user interface for interaction with a social media system, depicted in accordance with an illustrative embodiment;

DETAILED DESCRIPTION

The illustrative embodiments recognize and take into account one or more different considerations. For example, the illustrative embodiments recognize and take into account that an employer may need information about an employee when performing certain operations. The illustrative embodiments also recognize and take into account that searching information systems may be more cumbersome and time-consuming than desirable. Furthermore, the illustrative embodiments also recognize and take into account that verifying the truthfulness of assertions made in online profiles by prospective employees may be more cumbersome and time-consuming than desirable.

Thus, the illustrative embodiments provide a method, apparatus, and computer program product for graphically displaying verified employment data as part of a user's online profile. The employment verification system includes techniques that facilitate identifying and displaying employment verification information dynamically generated from trusted data sources. Employment verification techniques of the activity-based connection system may be applied to a wide variety of data types that may be gathered from a plurality of data sources existing across disparate devices, networks and in the cloud.

Figure 1:
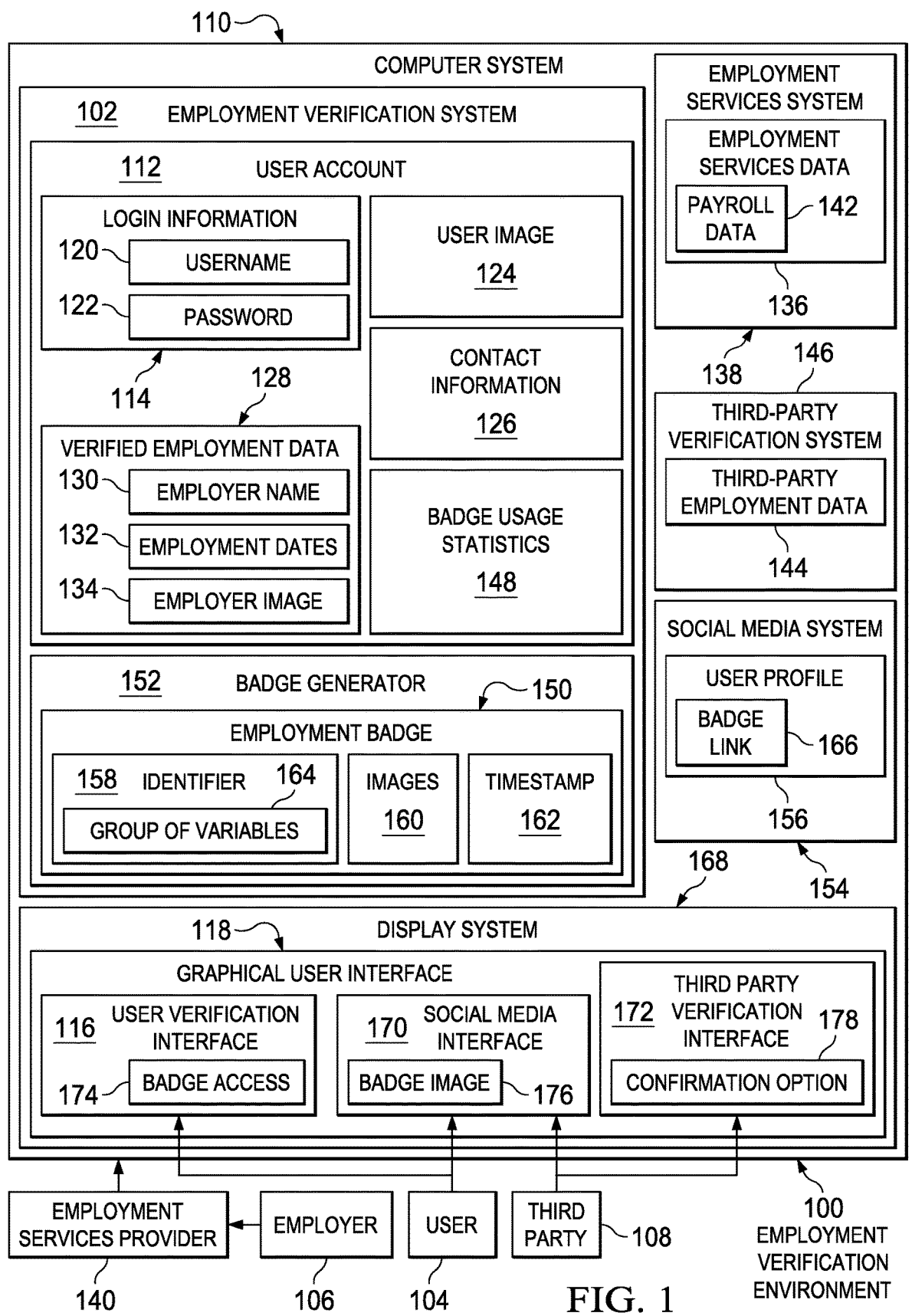
FIG. 1 is an illustration of a block diagram of an employment verification environment, depicted in accordance with an illustrative embodiment.

With reference now to the Figures and in particular with reference to FIG. 1, an illustration of a block diagram of an employment verification environment 100 is depicted in accordance with an illustrative embodiment. Employment verification environment 100 includes employment verification system 102.

Employment verification system 102 is used to perform operations with respect to user 104. The operations can be, for example but not limited to, at least one of providing verification of employment of user 104 by employers, such as employer 106, so that third parties, such as third party 108, can reasonably rely on assertions of employment made by user 104. As depicted, user 104 is a person who makes an assertion of current employment by, current association with, previous employment by, or previous association with an entity, such as employer 106. For example, user 104 can be for example but not limited to, at least one of a current/former employee of employer 106, a current/former officer of employer 106, a current/former administrator of employer 106, a current/former manager of employer 106, a current/former supervisor of employer 106, and a current/former contractor of employer 106.

Employment verification system 102 can be implemented in computer system 110, where the computer system is a hardware system includes one or more data processing systems. When more than one data processing system is present, those data processing systems may be in communication with each other using a communications medium. The communications medium may be a network. The data processing systems may be selected from at least one of a computer, a workstation, a server computer, a tablet computer, a laptop computer, a mobile phone, a personal digital assistant (PDA), or some other suitable data processing system.

As used herein, the phrase "at least one of," when used with a list of items, means different combinations of one or more of the listed items may be used and only one of each item in the list may be needed. In other words, at least one of means any combination of items and number of items may be used from the list but not all of the items in the list is required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Employment verification system 102 includes user account 112. User account 112 is a collection of at least one of data, documents, information, and files of employment verification system 102 that relate to user 104. User 104 accesses user account 112 by entering login information 114 into user verification interface 116 of graphical user interface 118. As shown, login information 114 can include username 120 and password 122.

User account 112 can include user image 124. User image 124 is one or more graphic images that are associated with, or can uniquely identify user 104. In an illustrative embodiment, user image 124 can be a photograph of user 104.

User account 112 can include contact information 126. Contact information 126 is information used by employment verification system 102 to contact user 104 in response to a third party 108 seeking additional assurances of verified employment data 128. Contact information 126 can include, for example but not limited to, at least one of an e-mail address of user 104, a telephone number for user 104, and a short messaging service (SMS) address of user 104.

User account 112 can include your verified employment data 128. Verified employment data 128 is data relating to the employment status of user 104 by employer 106 that has been reasonably verified by employment verification system 102. Verified employment data 128 can include data such as, but not limited to, at least one of employer name 130, employment dates 132 and an employer image 134.

Verified employment data 128 can include employer name 130. Employer name 130 is a corporation name or other identifier of employer 106. Employer name 130 can include, for example but not limited to, at least one of a corporation name a name under which employer 106 is doing business as, a subdivision of employer 106, or other identifier of an entity with which user 104 has or has had an employment relationship with employer 106.

Verified employment data 128 can include employment dates 132. Employment dates 132 is a date, duration, or calendar period on which user 104 has or has had an employment relationship with employer 106.

Verified employment data 128 can include employer image 134. Employer image 134 is one or more graphic images that are associated with, or can uniquely identify employer 106. For example, employer image 134 may be selected from at least one of any word, name, symbol, device, or any combination, used or intended to be used to identify, distinguish, and indicate the source of the goods or services provided by employer 106. In an illustrative embodiment, employer image 134 can be a registered trademark of employer 106.

According to an illustrative embodiment, employment verification system 102 can retrieve verified employment data 128 from employment services data 136 of employment services system 138. Employment services system 138 is system that is used by employment services provider 140 to perform operations with respect to employer 106. The operations can be, for example but not limited to, providing payroll management services for employer 106. Payroll management services can include, for example but not limited to, accounting services provided by employment services provider 140 to employer 106 that tracks amounts paid to employees for services they provided during a certain period of time. As part of providing payroll management services, employment services provider 140 can store employment services data 136 in employment services system 138.

Employment service data 136 can include, for example, payroll data 142. Payroll data 142 is employment services data 136 that relates to financial records of, for example but not limited to, salaries paid to employees of employer 106, wages paid to employees of employer 106, bonuses paid to employees of employer 106, and tax deductions to employer 106 based on the employment of employees of employer 106. When employment services provider 140 performs operations with respect to employer 106, employment verification system 102 can determine verified employment data 128 for employees of employer 106 from payroll data 142. Verified employment data 128 can include for example but not limited to, employer name 130, employer date 132, and employer image 134. Therefore, when employer 106 utilizes employment services provider 140, employment verification system 102 can determine any employment relationship between user 104 and employer 106 from employment services data 136. Employment services data 136 retrieved by employment verification system 102 then becomes part of user account 112 as verified employment data 128.

According to an illustrative embodiment, employment verification system 102 can retrieve verified employment data 128 from third-party employment data 144 of third-party verification system 146. Third-party verification system 146 is a system under the control of an entity other than employment services provider 140 that is used to verify or validate the employment history of user 104 with respect to employer 106. In an illustrative embodiment, employment verification system 102 can retrieve verified employment data 128 from third-party employment data 144 when employment services provider 140 does not provide services to employer 106. Third-party employment data 144 retrieved by employment verification system 102 then becomes part of user account 112 as verified employment data 128.

User account 112 includes badge usage statistics 148. Badge usage statistics 148 is data regarding a number of times employment badge 150 is generated by badge generator 152, a number of times employment badge 150 is accessed by social media system 154, and identity of social media system 154 that request employment badge 150, and other relevant data relating to the usage of employment badge 150.

Employment verification system 102 includes badge generator 152. Badge generator 152 generates employment badge 150 when a request is received from social media system 154 for the display of verified employment data 128 in user profile 156. Employment badge 150 is a graphical attestation by employment verification system 102 of the veracity of verified employment data 128 as displayed in user profile 156 of social media system 154. Employment that 150 can include, for example but not limited to, at least one of identifier 158, images 160, and timestamp 162.

Badge generator 152 may be implemented in software, hardware, firmware or a combination thereof. When software is used, the operations performed by badge generator 152 may be implemented in program code configured to run on hardware, such as a processor unit. When firmware is used, the operations performed by badge generator 152 may be implemented in program code and data and stored in persistent memory to run on a processor unit. When hardware is employed, the hardware may include circuits that operate to perform the operations in badge generator 152.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Employment badge 150 can include identifier 158. Identifier 158 is an identifier that uniquely identifies at least one of user account 112, and verified employment data 128 within employment verification system 102. In one illustrative embodiment, identifier 158 may be a universal resource locator that includes group of variables 164. Group of variables 164 identifies verified employment data 128 within employment verification system 102. In one illustrative embodiment, group of variables 164 may comprise alphanumeric text.

Employment badge 150 can include images 160. Images 160 can include one or more graphic images that are associated with, or can uniquely identify user 104, such as user image 124. Images 160 can include one or more graphic images that are associated with, or can uniquely identify employer 106, such as employer image 134. Additionally, images 160 can include one or more graphic images that are associated with, or can uniquely identify other parties, such as employment services provider 140.

As is illustrated, images 160 of employment badge 150 can include user image 124. Images 160 displayed within employment badge 150 therefore provide a first level of verification of the employment status of user 104. If an entity other than user 104 attempts to utilize employment badge 150, any difference in pictures makes it evident that employment badge 150 is being used fraudulently by the wrong person.

In an illustrative embodiment, badge generator 152 dynamically generates employment badge 150 when employment verification system 102 receives a request from social media system 154. Employment badge 150 can therefore include timestamp 162. Timestamp 162 is a sequence of characters or encoded information identifying when employment badge 150 is created by badge generator 152. In an illustrative embodiment, Timestamp 162 can indicate a date and time of day identifying when employment badge 150 is created by badge generator 152.

As used herein, social media system 154 is any system on which user 104 can create user profile 156 and indicate verified employment data 128. Social media system 154 therefore can include websites or online services that facilitate communication with an online community of people who use the websites or online service to communicate with each other and share information and resources. Additionally, social media system 154 can also include job posting boards or career building sites that allow a user to view available employment position posted by employer and upload user profile 156 to express interest in or apply for the employment position.

User profile 156 is the profile of user 104 within social media system 154. User profile 156 includes badge link 166. Social media system 154 utilizes badge link 166 to retrieve employment badge 150 from employment verification system 102. In an illustrative embodiment, badge link 166 is an encrypted string of login information 114.

As depicted, computer system 110 includes display system 168. In this illustrative example, display system 168 can be a group of display devices. A display device in display system 168 may be selected from one of a liquid crystal display (LCD), a light emitting diode (LED) display, an organic light emitting diode (OLED) display, and other suitable types of display devices.

In this illustrative example, display system 168 includes graphical user interface 118. In an illustrative example, employment verification system 102 can display information such as for example, at least one of user account 112, login information 114, user image 124, contact information 126, verified employment data 128, and badge usage statistics 148 in graphical user interface 118. In an illustrative example, social media system 154 can display information such as for example, at least one of user profile 156 and verified employment data 128 in graphical user interface 118.

Employment verification system 102 may receive user input selecting the display information in graphical user interface 118. Employment verification system 102 may also receive user input through graphical user interface 118 requesting verification of employment of user 104 by employers, such as employer 106, so that third parties, such as third party 108, can reasonably rely on assertions of employment made by user 104.

Graphical user interface 118 can include a number of interfaces for interacting with the different systems of employment verification environment 100. As depicted, graphical user interface 118 includes user verification interface 116, social media interface 170, and third-party verification interface 172.

Graphical user interface 118 can include user verification interface 116. User verification interface 116 is a graphical user interface through which user 104 can interact with employment verification system 102. User verification interface 116 includes badge access 174. Badge access 174 is an interactive icon, hyperlink, link or graphic displayed within a graphical user interface, such as graphical user interface 118, through which user 104 can request badge link 166 for posting to user profile 156 of social media system 154.

Graphical user interface 118 can include social media interface 170. Social media interface 170 is a graphical user interface through which user 104 or third parties 108 can interact with user profile 156 of social media system 154.

When user 104 interact with social media interface 170, user 104 can add badge link 166 to user profile 156. Subsequent interactions by user 104 or third party 108 with social media interface 170 causes badge link 166 to retrieve employment badge 150 from badge generator 152. Social media interface 170 can therefore display badge image 176. Badge image 176 is a digital image of employment badge 150 displayed within social media interface 170 indicating the veracity of verified employment data 128, has asserted by employment verification system 102. Badge image 176 can include graphical display or image of at least one of verified employment data 128 images 160, and timestamp 162.

In an illustrative embodiment, badge image 176 is interactive. In an illustrative embodiment, an interaction with badge image 176 within social media interface 170 receives can launch or display third-party verification interface 172. Third-party verification interface 172 is a graphical user interface through which third party 108 can interact with employment verification system 102. Third-party verification interface 172 provides an interface through which third party 108 can access additional information and details regarding user 104 and verified employment data 128.

In another illustrative embodiment, social media interface 170 can display a separate verification link. An interaction with the separate verification link within social media interface 170 can launch or display third-party verification interface 172.

In an illustrative embodiment, third-party verification interface 172 includes confirmation option 178. Confirmation option 178 is an interactive icon, hyperlink, link or graphic displayed within a graphical user interface, such as graphical user interface 118, through which third party 108 can request additional assurances from user 104 regarding verified employment data 128 as indicated in badge image 176. In response to receiving an interaction with confirmation option 178, employment verification system 102 uses contact information 126 to request additional assurances from user 104.

In the illustrative example, employment verification system 102 may be used to providing verification of employment of user 104 by employers, such as employer 106. By providing verification of employment of user 104 by employers, such as employer 106, employment verification system 102 can enable a desired level of trustworthiness to verified employment data 128 so that third parties, such as third party 108, can reasonably rely on assertions of employment made by user 104.

As a result, computer system 110 operates as a special purpose computer system in which badge generator 152 in computer system 110 enables a desired level of trustworthiness to verified employment data 128 provided by employment verification system 102 in verifying the employment of user 104 by employers, such as employer 106. Badge generator 152 identifies a request for verified employment data. Badge generator 152 enables verification of employment of user 104 using verified employment data 128 received from trusted data sources, such as employment services data 136 of employment services system 138, and third-party employment data 144 of third-party verification system 146.

Badge generator 152 enables a desired level of trustworthiness to verified employment data 128 so that third parties, such as third party 108, can reasonably rely on assertions of employment made by user 104. Thus, badge generator 152 transforms computer system 110 into a special purpose computer system as compared to currently available general computer systems that do not have badge generator 152.

The illustration of employment verification system 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
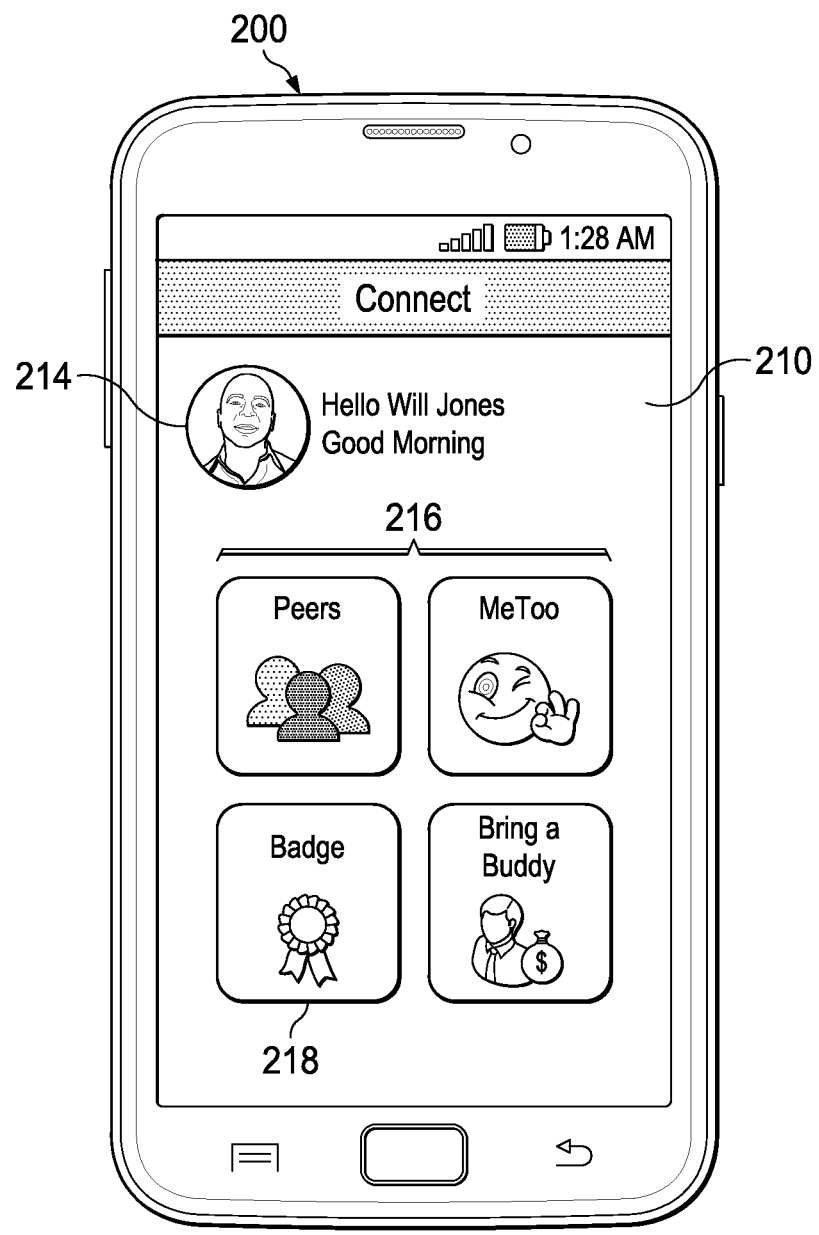
FIG. 2 is an illustration of a graphical user interface for user interaction with an employment verification system, depicted in accordance with an illustrative embodiment.

With reference next to FIG. 2, an illustration of a graphical user interface for user interaction with an employment verification system is depicted in accordance with an illustrative embodiment. As depicted, user verification interface 210 is an example of user verification interface 116 of graphical user interface 118 in FIG. 1.

User verification interface 210 is displayed on the display system 212 of computer system 200. A display system 212 is an example of display system 168 of FIG. 1. The computer system 200 is an example of computer system 110 of FIG. 1. As depicted, user verification interface 210 includes user image 214 and a plurality of icons 216.

User image 214 is an example of user image 124 of FIG. 1. User image 214 is a graphic image that is associated with, or can uniquely identify a user, such as user 104 of FIG. 1.

Plurality of icons 216 are interactive graphic representations with which a user can interact with an employment verification system, such as employment verification system 102, using user verification interface 210. Plurality of icons 216 includes badge access 218. Badge access 218 is an example of badge access 174 of FIG. 1. Badge access 218 is an interactive icon displayed within a user verification interface 210, through which user 104 can request a badge link, such as badge link 166 of FIG. 1, as well as view additional information related to the user account, such as badge usage statistics 148 of FIG. 1.

Figure 3:
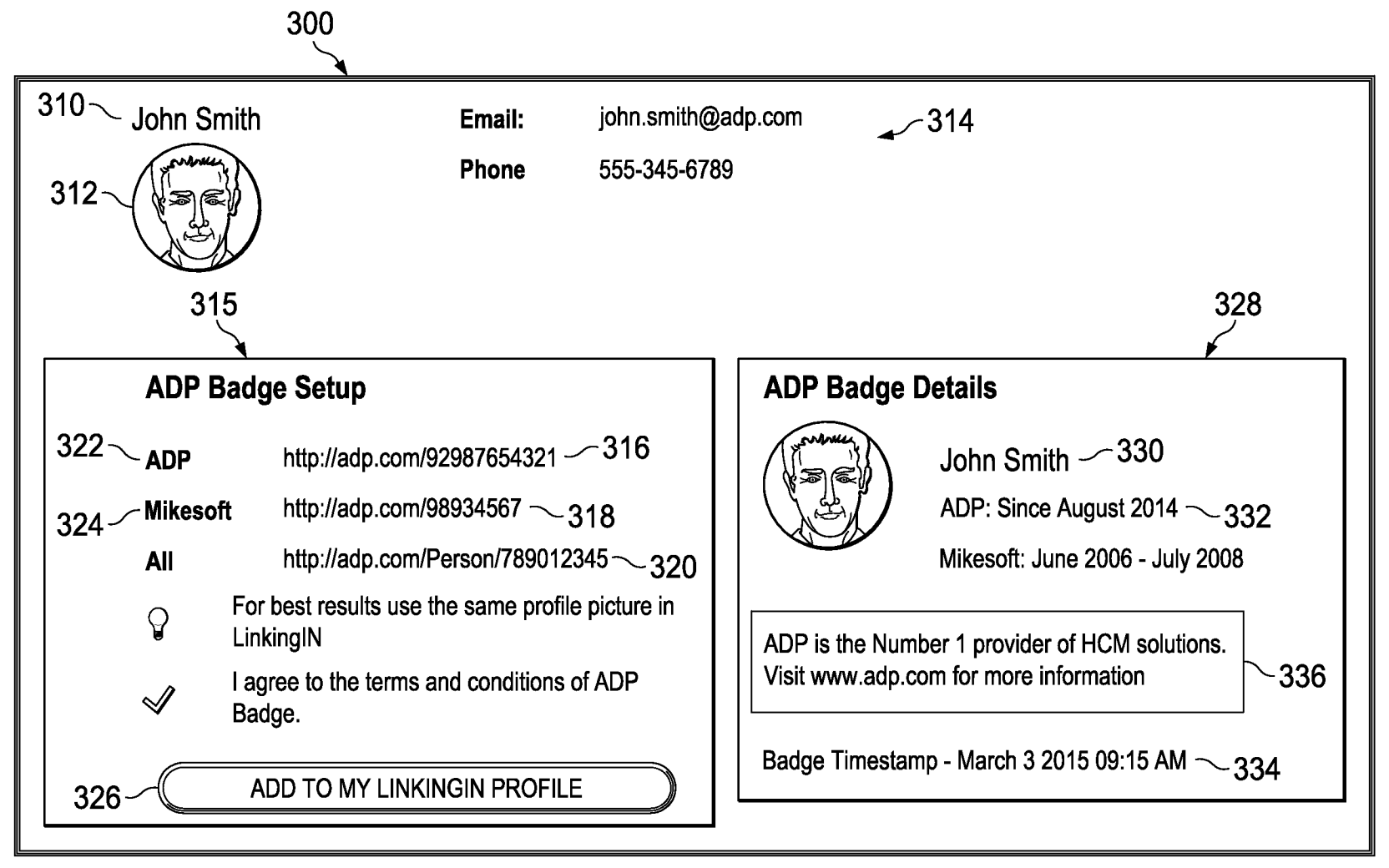

With reference next to FIG. 3, an illustration of an employment badge within a graphical user interface is depicted in accordance with an illustrative embodiment. As depicted, graphical user interface 300 is an example of user verification interface 210 after interaction with badge access 218.

As depicted, graphical user interface 300 includes username 310 and user image 312. Username 310 is an example of username 120 of FIG. 1. User image 312 is an example of user image 124 of FIG. 1.

Graphical user interface 300 includes contact information 314. Contact information 314 is an example of contact information 126 of FIG. 1. As depicted, contact information 314 includes an e-mail address, and a telephone number. Contact information 314 provides mechanisms by which a user can be informed regarding usage and retrieval of an employment badge, such as employment badge 150 of FIG. 1.

As depicted, graphical user interface 300 includes badge set up window 315. Badge set up window 315 includes identifier 316, identifier 318, and identifier 320. Each of identifiers 316, 318, and 320 is an identifier such as identifier 158 of FIG. 1. As depicted, identifier 316 is an identifier that uniquely identifies verified employment data of the user for employee 322. Identifier 318 is an identifier that uniquely identifies verified employment data of the user for employee 324. Identifier 320 is an identifier that uniquely identifies verified employment data for all employers associated with the user account.

As depicted, badge set up window 315 includes control 326. Control 326 is interactive icon displayed within graphical user interface 300 that allows a user to specify that proof of employment data for one of identifier 316, identifier 318, and identifier 320 be published to an associated social media account as proof of employment data. In an illustrative example, interaction with control 326 requests generation of a badge image that will be displayed in an associated user profile as proof of employment data. Additionally, interaction with control 326 can launch a social media interface, such as social media interface 170 of FIG. 1, directing the user to an associated user profile of the social media system, such as user profile 156 of FIG. 1.

As depicted, graphical user interface 300 includes badge preview 328. Badge preview 328 displays a graphical preview of a badge image that will be displayed in an associated user profile of a social media system, such as user profile 156 of FIG. 1. As depicted, badge preview 328 is a preview of badge image 176 of FIG. 1.

As depicted, badge preview 328 includes username 330, verified employment data 332, and timestamp 334. Username 330 can be for example, username 120 of FIG. 1. Verified employment data 332 is an example of verified employment data 128 of FIG. 1, displayed within an employment badge image, such as badge image 176 of FIG. 1. Timestamp 334 is an example of timestamp 162 of FIG. 1.

As depicted, badge preview 328 can also include advertising information 336. Advertising information 336 is information that can advertise verification services provided by the employment verification system to third parties, such as third parties 108 of FIG. 1, to entities providing employment services or employment verification services. As depicted, advertising information 336 is an advertisement for employment services provider 140 FIG. 1.

Figure 4:
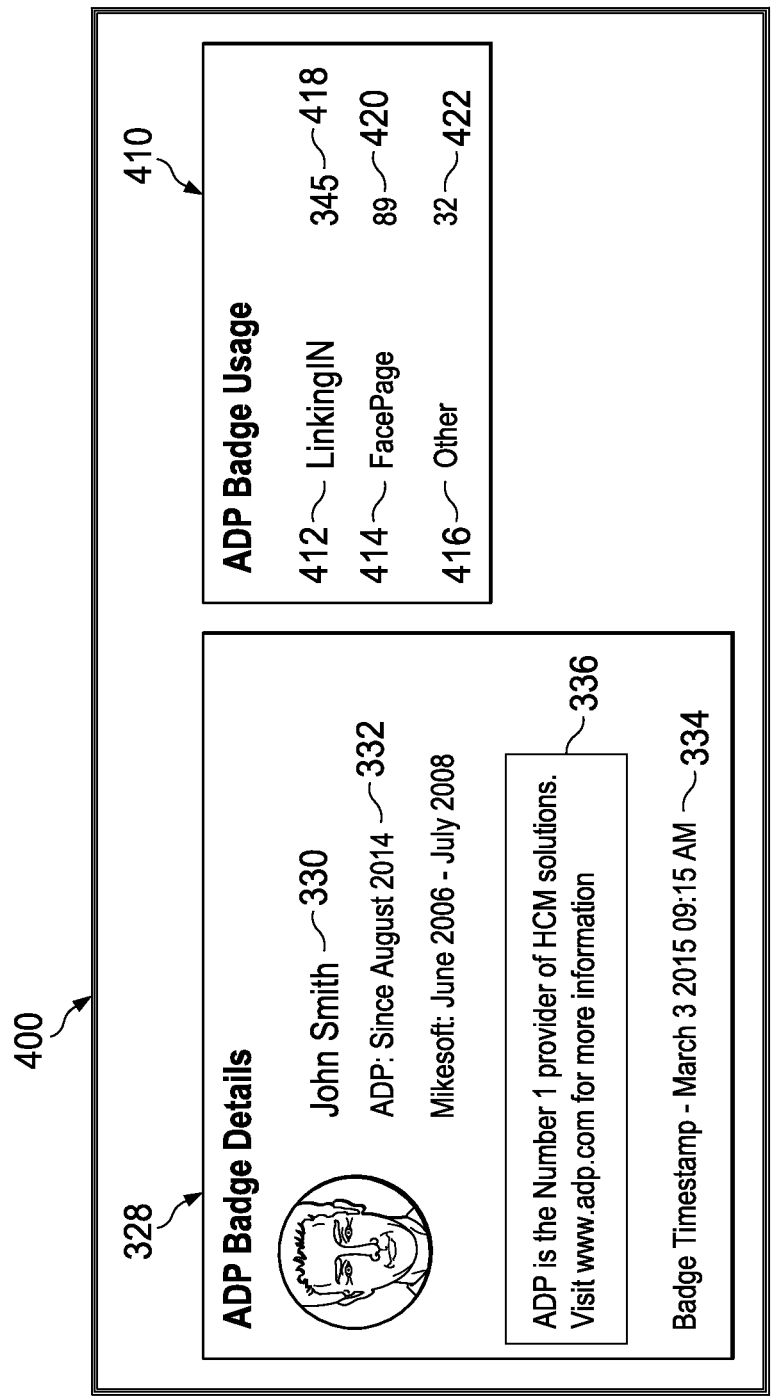
FIG. 4 is an illustration of an employment patch including batch usage statistics within a graphical user interface, depicted in accordance with an illustrative embodiment.

With reference next to FIG. 4, an illustration of an employment badge is including badge usage statistics within a graphical user interface is depicted in accordance with an illustrative embodiment. As depicted, graphical user interface 400 is an example of user verification interface 210 after interaction with badge access 218.

As depicted, graphical user interface 400 includes badge preview 328. Badge preview 328 includes username 330, verified employment data 332, timestamp 334, and advertising information 336.

As depicted, graphical user interface 400 also includes badge usage 410. Badge usage 410 is an example of badge usage statistics 148 of FIG. 1. As depicted, badge usage 410 includes a number of social media systems, including social media system 412, social media system 414, and aggregate systems 416. As depicted, each of social media system 412 and social media system 414 is an identity of a specific social media system that has requested access to verified employment data for display within a user profile of the associated social media system, such as user profile 156 of FIG. 1. As depicted, aggregate systems 416 is a plurality of social media systems whose access to verified employment data has been aggregated into a single displayed statistic. In an illustrative embodiment, a number of social media systems may be aggregated and displayed as aggregate systems 416 when the requested access to verified employment is insignificant when compared to requested access from specifically enumerated systems, such as social media system 412 and social media system 414. In another illustrative embodiment, social media systems may be aggregated and displayed as aggregate systems 416 until a number of requested access is from a specific social media system surpasses an associated threshold for display as a specifically enumerated system.

As depicted, social media system 412 is associated with a number of requested accesses 418. Social media system 414 is associated with a number of requested accesses 420. Aggregate systems 416 is associated with a number of requested accesses 422. Each of number of requested accesses 418, 420, and 422 is a number of times that the associated social media system has requested access to verified employment data for display within an associated user profile.

Figure 5:
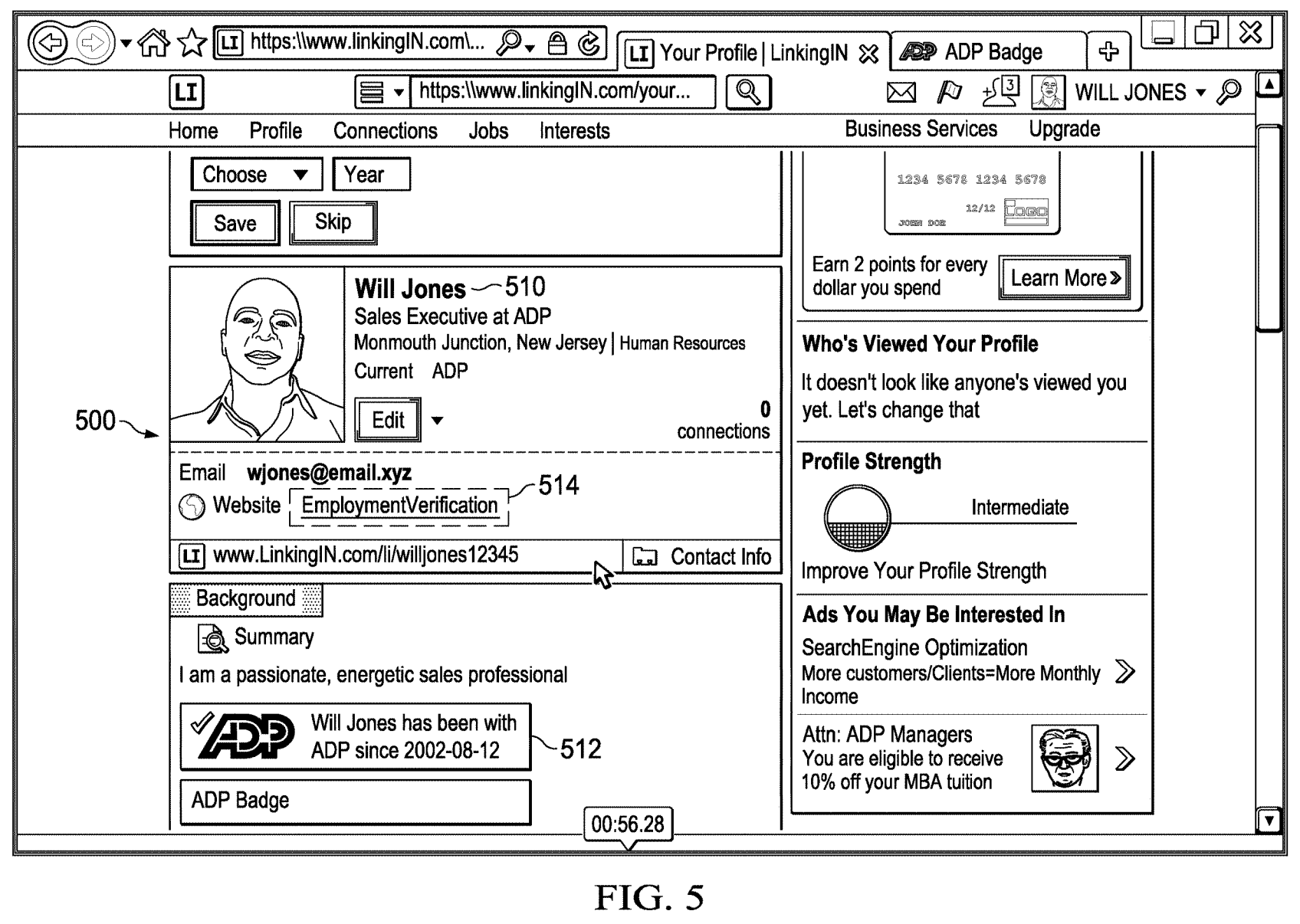

With reference now to FIG. 5, an illustration of a graphical user interface for interaction with a social media system is depicted in accordance with an illustrative embodiment. As depicted, social media interface 500 is an example of social media interface 170 of FIG. 1.

As depicted, social media interface 500 includes username 510. Username 510 is a username associated with a specific user profile of the social media system, such as user profile 156 of FIG. 1.

As depicted, social media interface 500 includes badge image 512. Badge image 512 is an example of badge image 176 of FIG. 1.

As depicted, social media interface 500 also includes verification link 514. Interaction with verification link 514 within social media interface 500 receives can launch or display a third-party verification interface, such as third-party verification interface 172 of FIG. 1.

Figure 6:
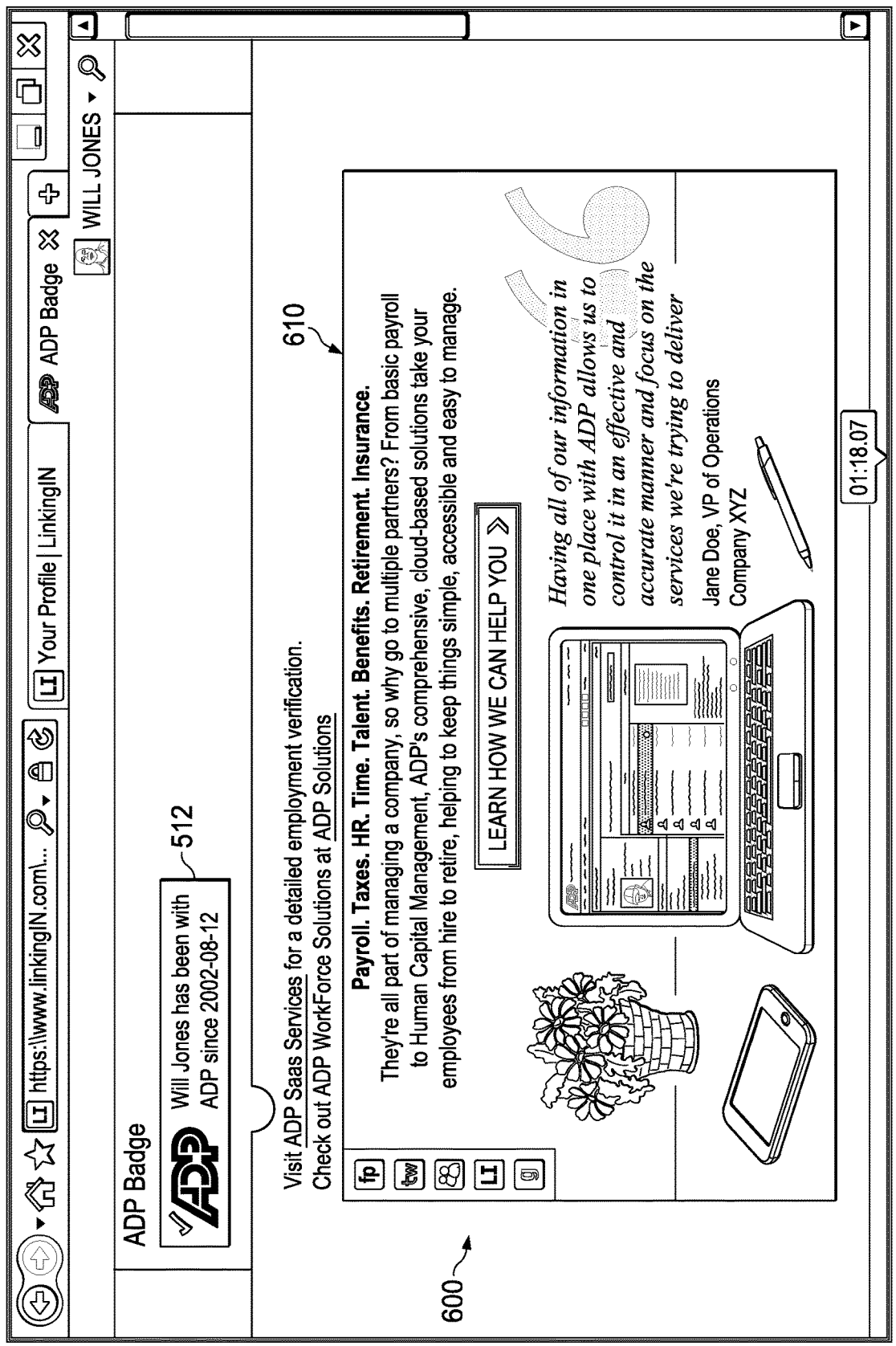
FIG. 6 is an illustration of a graphical user interface for displaying verified employment data, depicted in accordance with an illustrative embodiment.

With reference now to FIG. 6, a graphical user interface for displaying verified employment data is depicted in accordance with an illustrative embodiment. As depicted, graphical user interface 600 is an example of third-party verification interface 172 of FIG. 1.

Graphical user interface 600 is a graphical user interface through which a third party, such as third party 108 of FIG. 1, can interact with employment verification system 102. Graphical user interface 600 provides an interface through which the third party can access additional information and details regarding verified employment data displayed in badge image 512 of FIG. 5.

As depicted, graphical user interface 600 includes badge image 610. Badge image 610 is a digital image of verified employment data, such as indicated in employment badge 150 of FIG. 1, displayed within graphical user interface 600 indicating the veracity of verified employment data within badge image 512 of FIG. 5, as asserted by an employment verification system, such as employment verification system 102 of FIG. 1. Badge image 610 can include graphical display or image of at least one of verified employment data, images, and timestamps, such as verified employment data 128 images 160, and timestamp 162 of FIG. 1.

In an illustrative embodiment, a badge generator, such as badge generator 152 of FIG. 1, which dynamically generates employment badge, such as employment badge 150 of FIG. 1, and badge image 610 when employment verification is requested via verification link 514 of FIG. 5. Badge image 610 can therefore include a timestamp, such as timestamp 162 of FIG. 1, which indicates a date and time of day identifying when badge image 610 is created.

Figure 7:
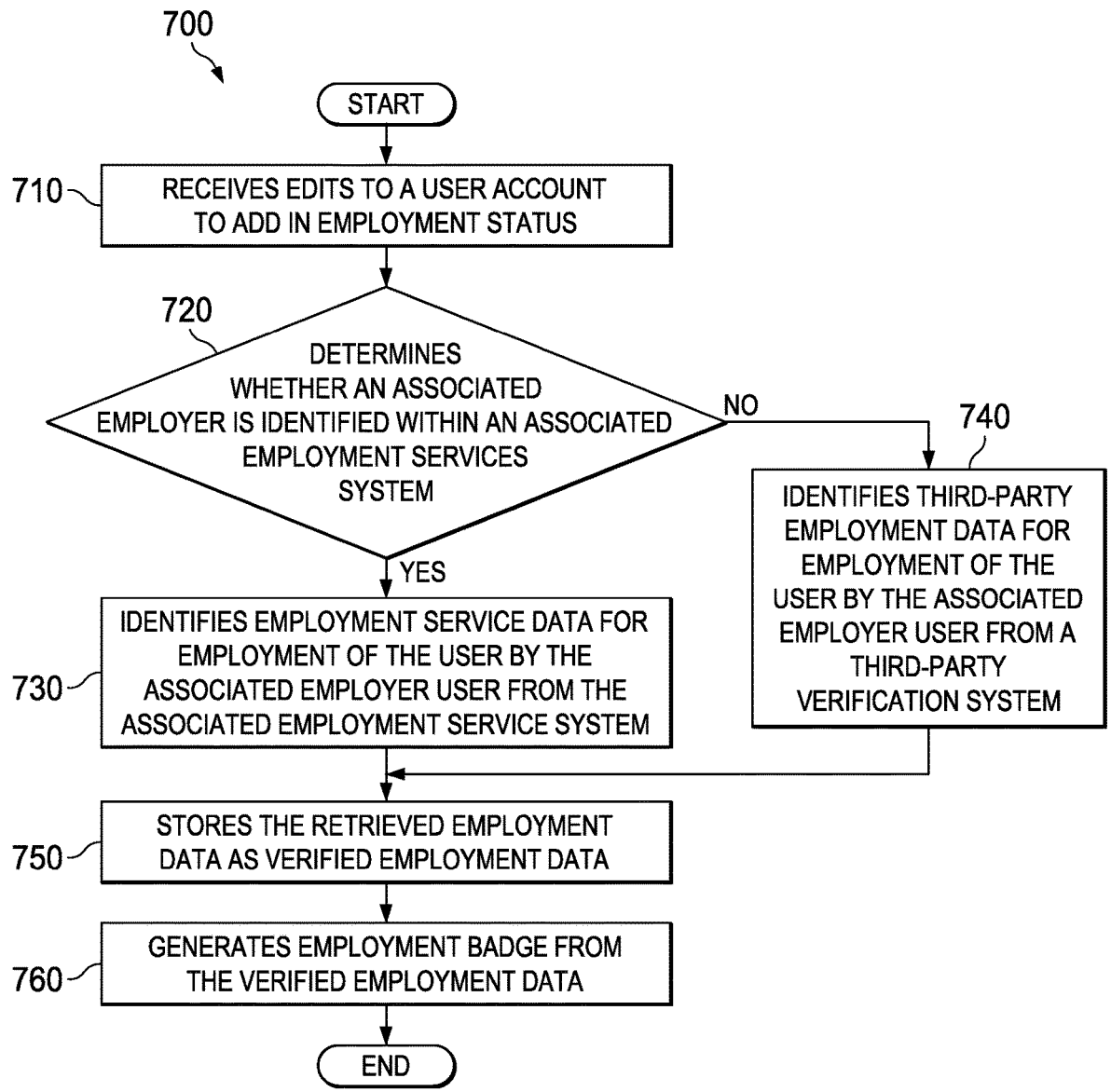
FIG. 7 is an illustration of a flowchart of a process for generating employment badge showing verified employment information, depicted in accordance with an illustrative embodiment.

With reference next to FIG. 7, an illustration of a flowchart of a process for generating employment badge showing verified employment information is shown according to an illustrative embodiment. Process 700 may be implemented in a badge generator, such as badge generator 152 in employment verification system 102 in employment verification environment 100 of FIG. 1.

Process 700 begins when a user edits a user account to add in employment status (step 710). The user can be user 104 of FIG. 1. User account can be user account 112 of FIG. 1. The employment status can be employment status with an employer, such as employer 106 of FIG. 1. User can have the employment status through interaction with a graphical user interface, such as user verification interface 116 of FIG. 1.

Process 700 determines whether an associated employer is identified within an associated employment services system (step 720). The employment services system can be, for example, employment services system 138 of FIG. 1. Responsive to the associated employer being identified with an associated employment services system ("yes" at step 720) process 700 identifies employment service data for employment of the user by the associated employer user from the associated employment service system (step 730). The employment service data can be employment service data 136 of FIG. 1.

Employment service data can include payroll data that relates to financial records of, for example but not limited to, salaries paid to employees the associated employer. When a user is identified from within the payroll data for an identified employer, employment verification system, such as employment verification system 102 is reasonably assured that the user has or has had an employment relationship with the associated employer.

Returning now to step 720, responsive to the associated employer not being identified with an associated employment services system ("no" at step 720) process 700 identifies third-party employment data for employment of the user by the associated employer user from a third-party verification system (step 740). The third-party verification system can be, for example, third-party verification system 146 of FIG. 1.

In an illustrative embodiment, third-party verification provides verification of employment data based on payment to an associated third-party employment verification entity. Process 700 can therefore initiate a small one-time fee from the user to retrieve the employment history from the third-party employment repetition entity.

Process 700 stores the retrieved employment data as verified employment data (step 750). Process 700 generates employment badge from the verified employment data (step 760), with the process terminating thereafter. The employment badge can be in the form in employment badge 150 of FIG. 1.

Figure 8:
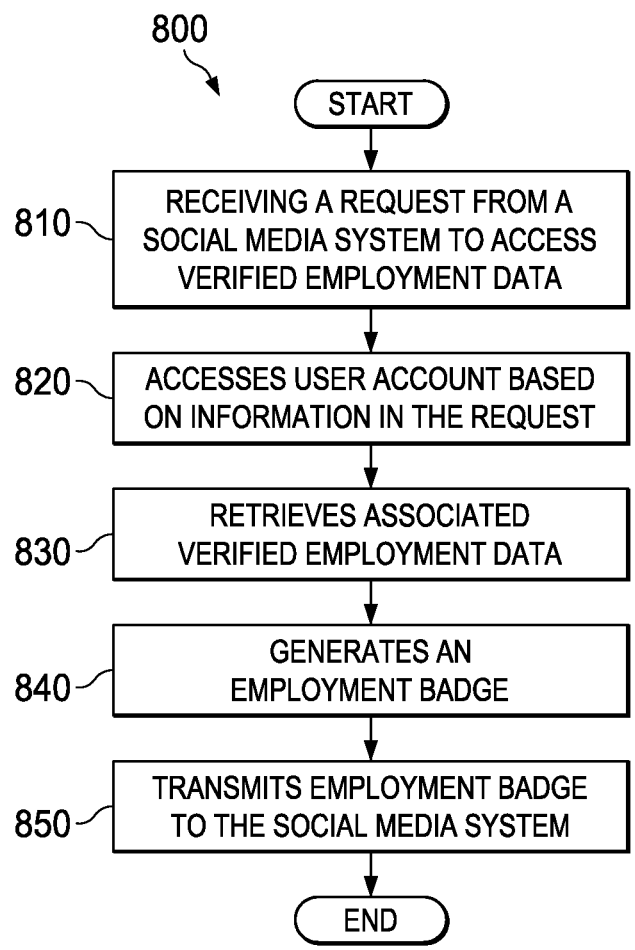
FIG. 8 is an illustration of a flowchart of a process for adding verified employment data to a user profile of a social media system, depicted according to an illustrative embodiment.

With reference next to FIG. 8, an illustration of a flowchart of a process for adding verified employment data to a user profile of a social media system is shown according to an illustrative embodiment. Process 800 may be implemented in a badge generator, such as badge generator 152 in employment verification system 102 in employment verification environment 100 of FIG. 1.

Process 800 begins by receiving a request from a social media system to access verified employment data (step 810). The request can include an encrypted string of login information, such as login information 114 of FIG. 1, identifying a specific user account, such as user account 112 of FIG. 1, or a specific verified employment data, such as verified employment data 128 of FIG. 1. In an illustrative embodiment, the request includes an encrypted string of group of variables 164. In an illustrative embodiment, the social media system utilizes a badge link, such as badge link 166 to request access to the verified employment data.

Process 800 accesses user account based on information in the request (step 820). Process 800 then retrieves associated verified employment data (step 830) and generates an employment badge (step 840). The employment badge can be, for example, employment badge 150 of FIG. 1.

Process 800 transmits employment badge to the social media system (step 850), with the process terminating thereafter. The social media system can display the employment badge as a badge image, such as badge image 176 of FIG. 1, within a graphical user interface, such as social media interface 170 of FIG. 1. In an illustrative embodiment, process 800 can transmit the employment badge to social media system using a suitable Internet based communications protocol such as but not limited to, at least one of Hypertext Transfer Protocol (HTTP), Hypertext Transfer Protocol over Secure Sockets Layer (HTTPS), or some other suitable internet based communications protocol.

In this manner, graphically displaying verified employment data as part of a user's online profile can be made more easily as compared to currently used techniques. The employment verification system includes techniques that facilitate identifying and displaying employment verification information dynamically generated from trusted data sources. As a result, organizations can quickly determine the truthfulness of assertions made by prospective candidates in online profiles. The organization's search results for qualified candidates are therefore more accurate, more trustworthy, and less time-consuming as compared to currently used techniques.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
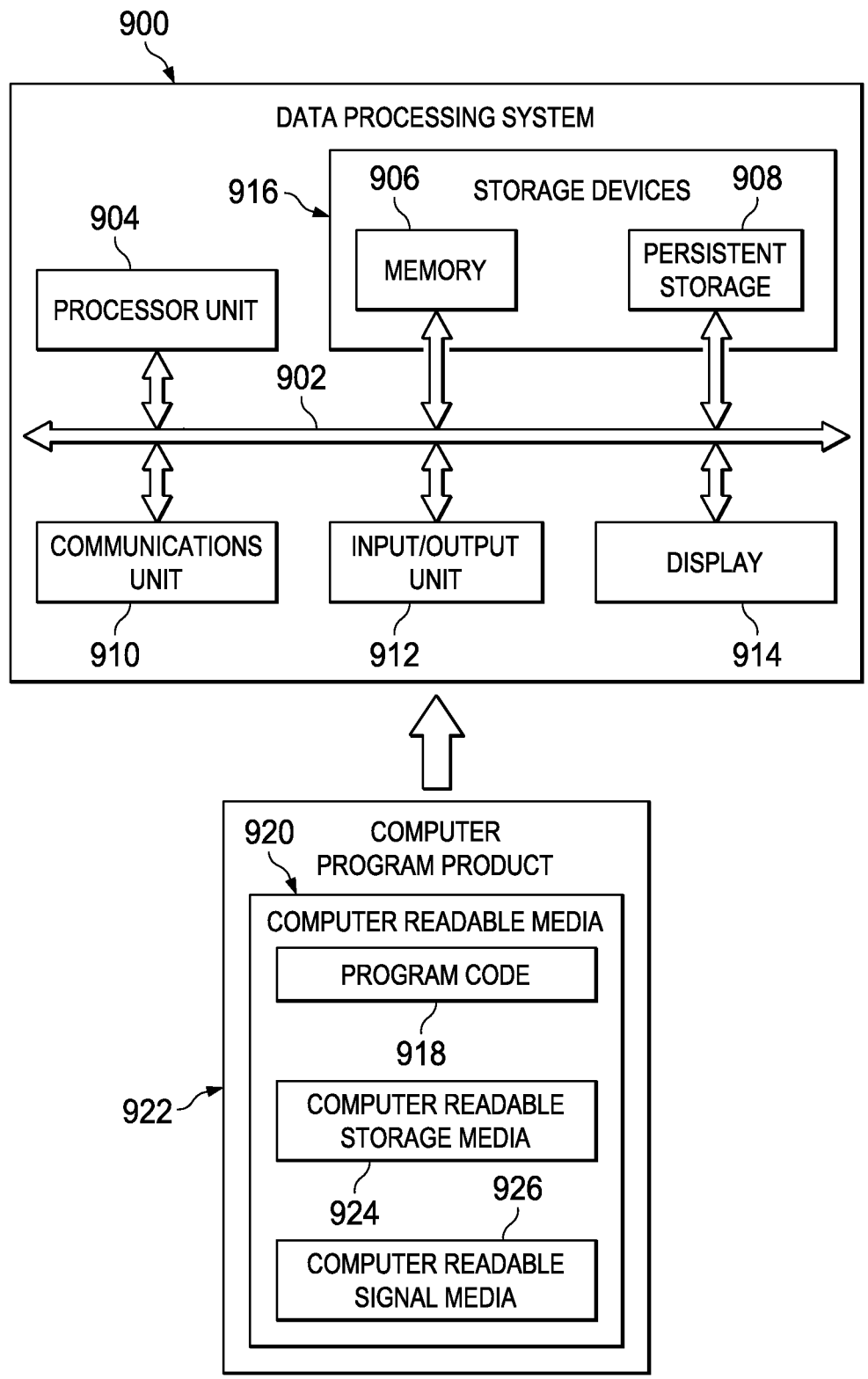
FIG. 9 is an illustration of a block diagram of a data processing system, depicted in accordance with an illustrative embodiment.

Turning now to FIG. 9, an illustration of a block diagram of a data processing system is depicted in accordance with an illustrative embodiment. Data processing system 900 may be used to implement one or more data processing systems in employment verification system 102 in FIG. 1. In this illustrative example, data processing system 900 includes communications framework 902, which provides communications between processor unit 904, memory 906, persistent storage 908, communications unit 910, input/output unit 912, and display 914. In this example, communication framework may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Thus, the illustrative embodiments provide a method, apparatus, and computer program product for graphically displaying verified employment data as part of a user's online profile. The employment verification system includes techniques that facilitate identifying and displaying employment verification information dynamically generated from trusted data sources. Employment verification techniques of the activity-based connection system may be applied to a wide variety of data types that may be gathered from a plurality of data sources existing across disparate devices, networks and in the cloud.

In this manner, graphically displaying verified employment data as part of a user's online profile can be made more easily as compared to currently used techniques. The employment verification system includes techniques that facilitate identifying and displaying employment verification information dynamically generated from trusted data sources. As a result, organizations can quickly determine the truthfulness of assertions made by prospective candidates in online profiles. The organization's search results for qualified candidates are therefore more accurate, more trustworthy, and less time-consuming as compared to currently used techniques.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. In particular, wellness manager is configured to perform the different operations described as well as other operations using at least one of program code, hardware, firmware, or other suitable components.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying proof of employment, the method comprising:
   receiving, by an employment verification computer system, payroll data from an employment services provider that provides payroll management services for an employer, wherein the payroll data relates to financial records that relate to the employment of an employee by the employer;
   storing, by the employment verification computer system, the payroll data within the employment verification computer system as verified employment data;
   receiving, by the employment verification computer system, a request from the employee for the proof of employment of the employee by the employer;
   in response to receiving the request, generating, by the employment verification computer system, a badge link, wherein the badge link includes an identifier comprising an encrypted string of login information of the employee and a group of variables that uniquely identifies the verified employment data of the employee within the employment verification computer system;
   posting, by the employment verification computer system, the badge link to a social media profile of the employee within a social media system;
   in response the social media system subsequently referencing the badge link, retrieving, by the employment verification computer system, the verified employment data of the employee from within the employment verification computer system based on the identifier;
   dynamically generating, by the employment verification computer system, an employment badge based on the verified employment data retrieved from within the employment verification computer system, wherein the employment badge comprises a graphic image that uniquely identifies the employer and a timestamp that indicates when the employment badge was created; and
   sending, by the employment verification computer system, the employment badge to the social media system, wherein the social media system displays a badge image of the employment badge in a graphical user interface for the social media system, wherein the badge image provides a graphical attestation to a veracity of the employment of the employee by the employer.

2. The method of claim 1, wherein referencing the badge link by the social media system comprises:

generating, by the social media system, a request for the proof of the employment data;
sending, by the social media system, the request to the employment verification system; and
receiving, by the social media system, the employment badge as proof of the employment data from the employment verification system.

3. The method of claim 2, wherein the identifier is a universal resource locator.

4. The method of claim 3, wherein the universal resource locator includes a group of variable(s) that identify the employment data within the employment verification system.

5. The method of claim 4, wherein the reference of the badge link by the social media system includes the group of variables.

6. The method of claim 1, wherein the identifier is alphanumeric text.

7. The method of claim 1, wherein the employment badge consists of an image of an employment services provider.

8. The method of claim 1, wherein the employment badge is generated by the employment verification system based on the employment data, an identity of the user, a logo of an employment services provider, and combinations thereof.

9. The method of claim 8, wherein the employment badge includes data from a third party, a logo from the third party, and combinations thereof.

10. The method of claim 2, wherein the social media system and the employment verification computer system communicate using at least one of http, https, or some other suitable internet based communications protocol.

11. The method of claim 1, wherein the employment data is selected from at least one of a name of an employer, a date of employment of an employee, and an image of the employer.

12. A computer system comprising:
a display system; and
a badge generator of an employment verification system in the computer system in communication with the display system, wherein the badge generator:
receives a request from the employee for the proof of employment of the employee by the employer;
in response to receiving the request, generates a badge link, wherein the badge link includes an identifier comprising an encrypted string of login information of the employee and a group of variables that uniquely identifies the verified employment data of the employee;
posts the badge link to a social media profile of the employee within a social media system;
in response the social media system subsequently referencing the badge link, retrieves the verified employment data of the employee from within the employment verification computer system based on the identifier;
dynamically generates employment badge based on the verified employment data retrieved from within the employment verification computer system, wherein the employment badge comprises a graphic image that uniquely identifies the employer and a timestamp that indicates when the employment badge was created; and
sends the employment badge to the social media system, wherein the social media system displays a badge image of the employment badge in a graphical user interface for the social media system, wherein the badge image provides a graphical attestation to a veracity of the employment of the employee by the employer.

13. The computer system of claim 12, wherein the badge generator retrieving the employment data further comprises the badge generator:
identifies the employment data from payroll data of employment services data selected from the group consisting of a salary paid to an employee by an employer, a wage paid to the employee by the employer, a bonus paid to the employee by the employer, and a tax deductions to the employer based on the employment of the employee; and
generating the employment badge from the payroll data of the employment services data.

14. The computer system of claim 13, wherein the identifier is a universal resource locator.

15. The computer system of claim 14, wherein the universal resource locator includes a group of variable(s) that identify the employment data within the employment verification system.

16. The computer system of claim 15, wherein of employment data of the employee is identified based on the group of variables.

17. The computer system of claim 12, wherein the identifier is alpha numeric text.

18. The computer system of claim 12, wherein the employment badge consists of an image of an employment services provider.

19. The computer system of claim 12, wherein the employment badge is generated by the employment verification system based on the employment data, an identity of the user, a logo of an employment services provider, and combinations thereof.

20. The computer system of claim 19, wherein the employment badge includes data from a third party, a logo from the third party, and combinations thereof.

21. The computer system of claim 12, wherein the employment data is selected from at least one of a name of an employer, a date of employment of an employee, and an image of the employer.

22. A computer program product for displaying proof of employment data, the computer program product comprising:
a non-transitory computer readable storage media;
program code, stored on the non-transitory computer readable storage media, for receiving payroll data from an employment services provider that provides payroll management services for an employer, wherein the payroll data relates to financial records that relate to the employment of an employee by the employer;
program code, stored on the non-transitory computer readable storage media, for storing the payroll data within an employment verification computer system as verified employment data;
program code, stored on the non-transitory computer readable storage media, for receiving a request from the employee for the proof of employment of the employee by the employer;
program code, stored on the non-transitory computer readable storage media, for generating a badge link in response to receiving the request, wherein the badge link includes an identifier comprising an encrypted string of login information of the employee and a group of variables that uniquely identifies the verified employment data of the employee within the employment verification computer system;

program code, stored on the non-transitory computer readable storage media, for posting the badge link to a social media profile of the employee within a social media system;

program code, stored on the non-transitory computer readable storage media, for retrieving the verified employment data of the employee from within the employment verification computer system based on the identifier in response the social media system subsequently referencing the badge link;

program code, stored on the non-transitory computer readable storage media, for dynamically generating, an employment badge based on the verified employment data retrieved from within the employment verification computer system, wherein the employment badge comprises a graphic image that uniquely identifies the employer and a timestamp that indicates when the employment badge was created; and program code, stored on the non-transitory computer readable storage media, for sending the employment badge to the social media system, wherein the social media system displays a badge image of the employment badge in a graphical user interface for the social media system, wherein the badge image provides a graphical attestation to a veracity of the employment of the employee by the employer.

23. The computer program product of claim 22, wherein the referencing the badge link by the social media system further comprises:

program code, stored on the non-transitory computer readable storage media, for generating a request for the proof of the employment data;

program code, stored on the non-transitory computer readable storage media, for sending the request to an employment verification system; and program code, stored on the non-transitory computer readable storage media, for receiving the employment badge as proof of the employment data from the employment verification system.

24. The computer program product of claim 23, wherein the identifier is a universal resource locator.

25. The computer program product of claim 24, wherein the universal resource locator includes a group of variable(s) that identify the employment data within the employment verification system.

* * * * *